(12) United States Patent
Sloop et al.

(10) Patent No.: US 9,484,606 B1
(45) Date of Patent: Nov. 1, 2016

(54) RECYCLING AND RECONDITIONING OF BATTERY ELECTRODE MATERIALS

(71) Applicant: Hulico LLC, Bend, OR (US)

(72) Inventors: Steven E. Sloop, Bend, OR (US); Marshall Allen, Bend, OR (US)

(73) Assignee: Hulico LLC, Bend, OR (US)

( * ) Notice: Subject to any disclaimer, the term of this patent is extended or adjusted under 35 U.S.C. 154(b) by 184 days.

(21) Appl. No.: 14/216,861

(22) Filed: Mar. 17, 2014

Related U.S. Application Data

(60) Provisional application No. 61/799,331, filed on Mar. 15, 2013.

(51) Int. Cl.
*H01M 10/54* (2006.01)
(52) U.S. Cl.
CPC ..................... *H01M 10/54* (2013.01)
(58) Field of Classification Search
CPC ...................................................... H01M 10/54
See application file for complete search history.

(56) References Cited

U.S. PATENT DOCUMENTS

| | | | |
|---|---|---|---|
| 8,846,225 B2 * | 9/2014 | Sloop .................. | H01M 10/052 117/2 |
| 2014/0175329 A1 * | 6/2014 | De Palma ............. | H01M 4/505 252/182.1 |

OTHER PUBLICATIONS

Sloop, Steven E., "Advanced Battery Recycling," US DoE Phase II SBIR Award DE-SC0006336, Feb. 28, 2013, 11 pages.
Sloop, Steven E., "Cost Reduction in Advanced Batteries Through Recycling," 30th International Battery Seminar & Exhibit, Mar. 2013, 14 pages.
Sloop, Steven E., "Advanced Battery Recycling," US DoE Phase II SBIR Award DE-SC0006336, Oct. 31, 2013, 10 pages.
Kim, Do-Su et al., "Simultaneous Separation and Renovation of Lithium Cobalt Oxide from the Cathode of Spent Lithium Ion Rechargeable Batteries," Journal of Power Sources vol. 132, pp. 145-149, May 20, 2004, 5 pages.

* cited by examiner

*Primary Examiner* — Helen O Conley
(74) *Attorney, Agent, or Firm* — Alleman Hall McCoy Russell & Tuttle LLP

(57) ABSTRACT

Embodiments are disclosed herein that relate to recycling and refurbishing battery electrode materials. For example, one disclosed embodiment provides a method comprising obtaining a quantity of spent electrode material, reacting the spent electrode material with an aqueous lithium solution in an autoclave while heating the spent electrode material and the aqueous lithium solution to form a hydrothermally reacted spent electrode material, removing the hydrothermally reacted spent electrode material from the aqueous lithium solution, and sintering the hydrothermally reacted spent material to form a recycled electrode material.

11 Claims, 14 Drawing Sheets

RECYCLING AND RECONDITIONING OF BATTERY ELECTRODE MATERIALS

CROSS-REFERENCE TO RELATED APPLICATION

This application claims the benefit under 35 U.S.C. 119(e) of U.S. Provisional Patent Application No. 61/799,331, filed Mar. 15, 2013 and entitled RECYCLING OF BATTERY ELECTRODE MATERIALS, the entirety of which is incorporated herein by reference for all purposes.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of SBIR award DE-SC0006336.

TECHNICAL FIELD

The present application relates to the field of lithium-based energy-storage devices, and more particularly, to recycling lithium-based energy-storage devices.

BACKGROUND

Lithium-based energy-storage devices are used in a variety of consumer products. Examples of such devices include supercapacitors, ultracapacitors, and more commonly lithium cells and lithium-ion cells. Some lithium-based energy-storage devices are rechargeable and have relatively long useful lifetimes. Nevertheless, they eventually fail or are discarded prior to failure, and therefore contribute to a significant and growing waste stream. In view of this situation, environmental regulations, industry standards, and collection services have arisen to promote the recycling of lithium-based energy storage devices.

Current recycling procedures for lithium-ion rechargeable cells may include two general approaches, pyrometallurgy and hydrometallurgy. Pyrometallurgical processing utilizes high temperatures to decompose and melt materials within the lithium cells leading to the recovery of metallic cobalt, or cobalt containing alloys. Such processing techniques thus generally involve the decomposition of the active electrodes, casing, current collectors, packaging, and therefore require further steps to manufacture the positive electrode material from the recovered metallic cobalt, nickel and/or alloys. Hydrometallurgic decomposition of lithium cells utilizes strong acids or bases and leads to the recovery of cobalt salts through multistep processing and precipitation. Kim et. al. (J. Power Sources 132 (2004) 145) teach a variation of a hyrometallurgic process in which $Li_xCoO_2$ from the spent battery is fully dissolved using a concentrated lithium hydroxide solution and precipitated again as hexagonal $LiCoO_2$. However, such dissolution and precipitation requires the use of highly concentrated caustic chemicals.

SUMMARY

Accordingly, embodiments are disclosed herein that relate to recycling and refurbishing battery electrode materials. For example, one disclosed embodiment provides a method comprising obtaining a quantity of spent electrode material, reacting the spent electrode material with an aqueous lithium solution in an autoclave while heating the spent electrode material and the aqueous lithium solution to form a hydrothermally reacted spent electrode material, removing the hydrothermally reacted spent electrode material from the aqueous lithium solution, and sintering the hydrothermally reacted spent electrode material to form a recycled electrode material.

It will be understood that the Summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
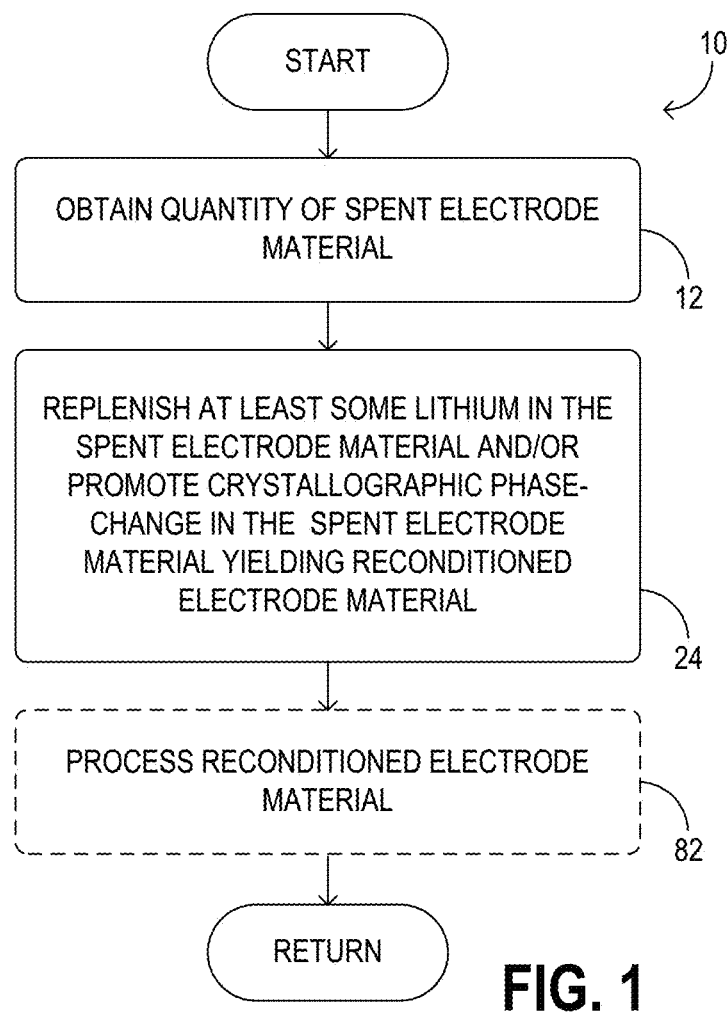
FIG. 1 shows an example embodiment of a method for recycling an electrode material for an energy-storage device.

Energy storage devices may rely on intercalation of ions in crystallographic lattice structures in the anode and cathode materials. For example rechargeable lithium-ion and lithium-ion polymer energy storage devices may be based on the reversible storage of lithium ions in the crystal structures of the anode and cathode materials.

Mixtures of various electrode materials may be used in such energy storage devices. For example, in lithium-ion or lithium-ion polymer batteries, anode electrode materials may include one or more of lithium-intercalated graphite carbon, (e.g., Li$_x$C$_6$), silicon and LiTi$_2$O$_4$, and cathode electrode materials may include one or more of Li$_x$CoO$_2$, Li$_x$Mn$_2$O$_2$, LiNiO$_2$, LiNi$_{0.8}$Co$_{0.15}$Al$_{0.05}$O$_2$ (generally referred to as NCA), LiNi$_x$Co$_y$Mn$_z$O$_2$ (for example with Li: (x+y+z)=1.05-1.10, generally referred to as NCM's or NMC's or HENCM, "high energy NCM"), and/or substituted and/or doped congeners thereof. Other materials may include lithium metal phosphate materials such as Li$_x$M'PO4 in which M'=Fe, Co, V, Fe/Mn, Co/Mn or other transition metal ions with dopant metals or mixtures. The positive electrode material in these batteries may be a physical mixture of one or more of the examples provided.

Performance of such energy storage devices may become degraded after use. For example, during charge and discharge cycles, lithium ions are extracted from and reintercalated into the positive electrode lattice, causing off-stoichiometric compositions such as Li$_{1.1-a}$Ni$_x$Co$_y$Mn$_z$O$_2$ or Li$_x$M'PO4.

For example, when a lithium-ion cell is first manufactured, the positive electrode may include Li$_x$CoO$_2$ with x=1, i.e., the Li:Co ratio may be 1:1. However, when a lithium-ion cell reaches its end of life, the stoichiometry of the positive electrode may be Li$_x$CoO$_2$, with 0.5<x<0.9. Likewise for LiNi$_x$Co$_y$Mn$_z$O$_2$ faded electrode material may have Li: (x+y+z)<1.05-1.10. A variety of factors may contribute to x<1, including external circuitry which prevents the cell from fully discharging to x=1, side reactions that remove lithium from the charge/discharge circuit, e.g., 'dead' lithium in the form of Li$_2$CO$_3$, LiF, Li$_2$O or other solid salt precipitates, and the original design of the battery as limited by the capacity of the positive electrode or the negative electrode.

Additionally, the repeated insertion and extraction of lithium ions with electrode materials may cause crystallographic transformations from a first crystallographic state to a second crystallographic state to occur in the electrode materials, which can contribute to performance decline of the cell. For example, LiCoO$_2$, and variations upon which cobalt is substituted with another metal ion, such as (but not limited to) LiNi$_x$Co$_y$Mn$_z$O$_2$, LiNi$_x$Co$_y$O$_2$, or LiNi$_x$Co$_y$Al$_z$O$_2$, may perform optimally in lithium-ion battery applications when substantially in a hexagonally layered crystallographic state. However, upon use, a portion of such a hexagonally layered structure may convert at least partially to a spinel crystallographic structure. Spinel LiCoO$_2$, and/or substituted/doped congeners thereof, do not perform as well in lithium cells as hexagonal LiCoO$_2$ due to such factors as increased hysteresis between the lithium de-intercalation and intercalation processes, for example. Thus, as a result of management and use, when a cell is at its end-of-life, the positive electrode material may include spinel and hexagonal crystallographic phases with a ratio of Li:Co<1:1.

In other examples, some positive electrodes materials may perform optimally when in a spinel crystallographic state. Examples of electrode materials principally in the spinel phase during manufacture and use include Li$_2$[Mn]$_2$O$_4$ and/or substituted and/or doped congeners thereof, such as materials in which transition metals such as Co, Ni, or Cr may be substituted for Mn in the lattice in order to suppress Jahn-Teller (J-T) distortions in the lattice. However, upon use, concentrations of J-T distortions may increase in such a spinel-based electrode material. Further, such materials also may lose lithium and manganese (i.e. frequently referred to as "manganese dissolution" in the literature) from the lattice during use.

Accordingly, embodiments are disclosed herein that relate to methods for directly recycling spent lithium battery materials through topotactic intercalation of lithium, which reinstates the lithium content in the solid state material to x=1; and/or through thermal treatment to prompt advantageous crystallographic changes in the spent materials. It will be understood that spent electrode material may include any electrode material that is at least partially degraded, has failed or was discarded prior to failure, and/or is obtained from a waste or recycling stream, for example. In other examples, a spent electrode material may include any electrode material that has at least partially undergone a change of crystallographic state and/or suffered from lithium loss, for example any electrode material which has been used for any period of time following manufacture.

FIG. 1 shows an example method 10 for recycling a quantity of spent electrode material to yield a reconditioned electrode material which may be re-used in energy storage devices. At 12, method 10 includes obtaining a quantity of spent electrode material. Spent electrode material may be obtained from a variety of sources and by a variety of methods. Further, obtaining a quantity of spent electrode material may include one or more harvesting, preparation, treatment and/or processing steps. Further, a quantity of spent electrode material may be obtained from a recycling or waste stream. The recycling or waste stream from which the spent electrode material is obtained may be a dedicated battery recycling or waste stream, or more particularly, a lithium-battery recycling or waste stream. Further, the spent electrode material may be obtained from the waste or recycling stream in any suitable manner.

Various processing and preparation steps may be implemented prior to, during, and/or following the obtainment of a quantity of spent electrode material. In some examples, batteries may be deconstructed into their cathode, anode, and package parts. For example, various treatments such as carbon dioxide or other extraction fluids may be employed to remove electrolytes and/or unwanted waste products. Additionally, appropriate cleaning routines may be employed to remove dirt, moisture, oil, etc., for example via an alcohol rinse. In other examples, full and/or partial discharge of energy storage and/or conversion devices may be performed by any suitable method. For example, a brine solution may be employed to discharge an energy storage and/or conversion device. Additionally, sorting, filtering, and/or milling methods may be implemented, for example.

Figure 2:
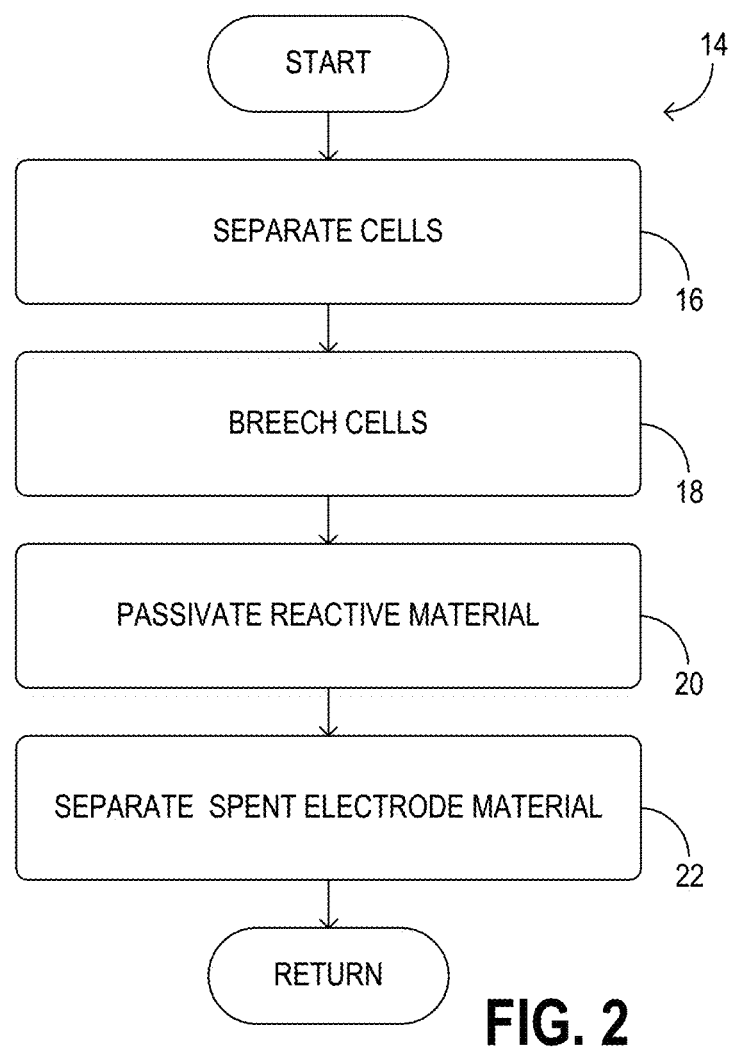
FIG. 2 shows an example embodiment of a method for obtaining a quantity of spent electrode material.

An example method 14 for obtaining a quantity of spent electrode material is shown in FIG. 2 wherein an energy storage device is separated into components for reconditioning. At 16, method 14 includes separating the cells of a spent battery if the battery comprises more than one cell. Separating the cells of the spent battery may comprise removing or opening an envelope of the battery, for example. If the battery contains a single cell, this step may be omitted.

At 18, method 14 includes breeching the enclosures of the cells of the battery. Breeching the enclosures may involve drilling or cutting the enclosures, for example. These actions may be most appropriately applied to cells not particularly designed to facilitate recycling. For cells that are designed to facilitate recycling, breeching the enclosures may involve puncturing or otherwise opening a dedicated breech passage. In these and other examples, the enclosures of the cells may be breeched in a controlled environment, e.g., in a reduced humidity or reduced dioxygen-content environment. In one, non-limiting example, the enclosures of the cells may be breeched under a dinitrogen atmosphere. Breeching the enclosures in such controlled environments may reduce the risk of fire associated with exposure of a lithium-containing negative electrode of a cell to water vapor and/or dioxygen, as discussed below.

At 20, method 14 includes passivating reactive material within the cells of the battery. The term 'passivate' is used herein to indicate reducing the chemical reactivity of a substance to make it safer to store and/or handle. A form of chemical reactivity that is contemplated in the context of lithium batteries is the combustibility of the negative electrodes of lithium and lithium-ion cells. Such negative electrodes may contain lithium metal or lithium-intercalated graphite, which may react violently with water and/or may spontaneously ignite in air. These materials may be passivated by controlled chemical oxidation and/or interaction with a Lewis base, such as an alkyl carbonate or ether, or a Lewis Acid. It is noted that this manner of passivation may be applied to other battery materials as well, in addition to lithium and lithium-ion battery materials. In one example, passivating the reactive material may comprise exposing the one or more breeched cells to air and/or water in a controlled manner. In another example, passivating the reactive material may comprise bathing the one or more breeched cells in a solvent such as liquid carbon dioxide or supercritical carbon dioxide, which may or may not include a controlled amount of an oxidant such as air or water or alcohol or suitable organic solvent added to the carbon dioxide. In these and other examples, the controlled environment in which the breeched cells are passivated may be configured to accommodate a release of dihydrogen or other gas-phase products that may be released when the lithium-containing negative electrodes of the one or more breeched cells are passivated.

At 22, method 14 includes separating a quantity of spent electrode material from the one or more breeched cells of the battery. In some examples, the quantity of spent electrode material separated from the one or more breeched cells may include a lithium-deficient form of lithium cobalt oxide ($LiCoO_2$), viz., $Li_{1-x}CoO_2$ where $0<x<1$. Thus, the lithium-deficient electrode material may be a positive electrode material used in a lithium or lithium-ion cell of the battery, for example. Accordingly, the lithium-deficient electrode material may further comprise various other materials, including graphitic and/or amorphous carbon. In these and other examples, the lithium-deficient electrode material may comprise lithium-deficient forms of other positive electrode materials used lithium and lithium-ion cells, e.g., $LiTiO2$, $LiFePO_4$, $LiMnO_2$, $LiNi_{0.80}Co_{0.05}Al_{0.15}O_2$.

In some examples, wherein the electrode material converts at least partially from a first crystallographic state to a second crystallographic state, the quantity of spent electrode material separated from the one or more breeched cells may include a portion of material in the second crystallographic state. For example, the quantity of spent electrode material separated from the one or more breeched cells may include $LiCoO_2$, and/or substituted/doped congeners thereof, in which at least a portion of the material is in a spinel crystallographic state. In other examples, the quantity of spent electrode material separated from the one or more breeched cells may include $Li_2[Mn]_2O_4$, $Li_xFePO_4$, and/or substituted/doped congeners thereof, containing undesirable concentrations of crystallographic defects such as J-T lattice distortions.

In some examples, an intact positive electrode and/or negative electrode may be separated from a breeched cell. In other examples, positive electrode material and/or negative electrode material, e.g., graphite, may be removed in pieces or in a finely divided state, e.g., as particles. Further, in examples where pieces or particles are separated from a breeched cell, the quantity of spent electrode material may be selected from a material stream based on a grain size, a particle size, or a structure size of the spent electrode material. To this end, sieving may be applied to a material stream comprising solids. Likewise, filtration or centrifugation may be applied to a material stream comprising a liquid having suspended or entrained pieces or particles. In some examples, separating the quantity of spent electrode material from the one or more breeched cells may further comprise rinsing the quantity of spent electrode material with a solvent, e.g., water or carbon dioxide, and allowing the quantity of spent electrode material to dry. This action may be taken in order to free the quantity of spent electrode material from adherent liquid electrolyte. In other examples, the rinsing and/or drying steps may be enacted prior to separating the quantity of spent electrode material from the one or more breeched cells.

It should be understood that one or more process steps within method 14 may be wholly or partly automated. Further, method 14 may be repeated for any desired number of spent batteries in the waste or recycling stream.

As described above, electrode material may convert at least partially from a first crystallographic state to a second crystallographic state when used in an energy storage device, and also may lose lithium. Thus, the quantity of spent electrode material obtained in step 12 of method 10 shown in FIG. 1 may comprise a portion of material in the second crystallographic state and/or material that is lithium deficient.

Therefore, following obtainment of a quantity of spent electrode material as described above, method 10 in FIG. 1 proceeds to 24. At 24, method 10 includes replenishing at least some lithium in the quantity of spent electrode material and/or promoting a change of crystallographic state in the quantity of spent electrode material to yield a reconditioned electrode material. The term "change of crystallographic state" and the like as used herein refers to a change in a lattice configuration of a material from a crystallographic state associated with a spent material to a crystallographic state associated with an unspent material. Examples of such changes of crystallographic state include, but are not limited to, phase changes, reduced concentrations of lattice distortions, etc.

Promoting a change of crystallographic state in the quantity of spent electrode material comprises applying heat to the quantity of spent electrode material under such conditions as to cause at least some of the portion of material in a second crystallographic state to convert to a first crystallographic state.

Replenishing at least some lithium in the quantity of spent electrode material and/or promoting a change of crystallographic state in the quantity of spent electrode material to yield a reconditioned electrode material may occur by a variety of methods and in any order. Further, one of replenishing at least some lithium in the quantity of spent electrode material and promoting a change of crystallographic state in the quantity of spent electrode material to yield a reconditioned electrode material may be omitted without departing from the scope of this disclosure.

Figure 3:
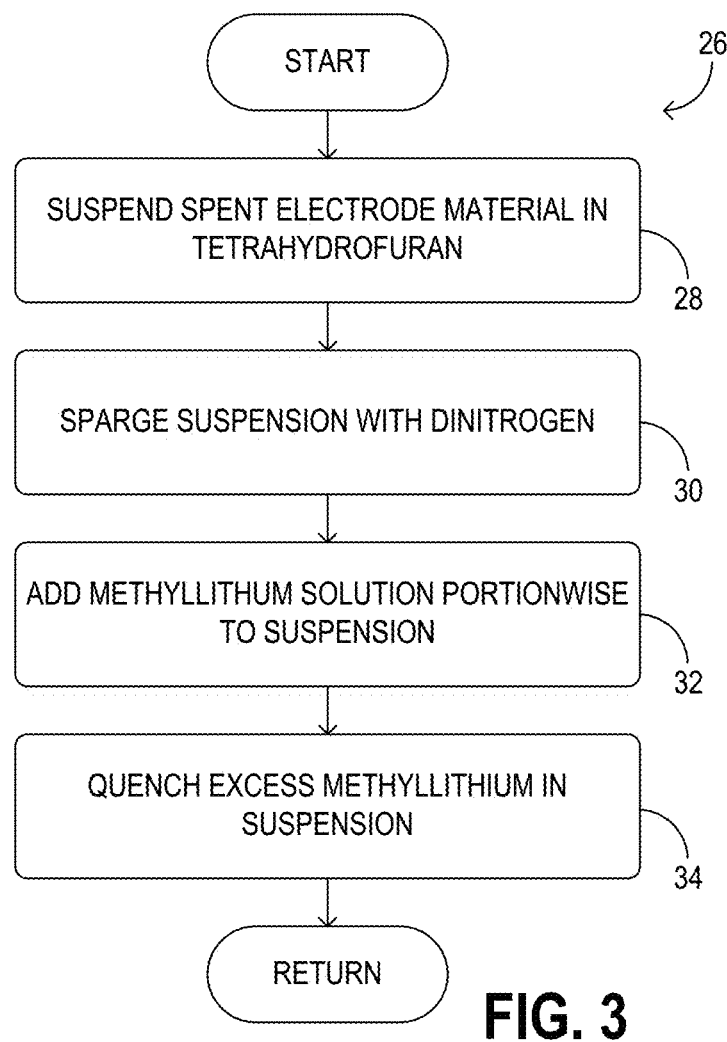
FIG. 3 shows an example embodiment of a method for replenishing at least some lithium in a quantity of spent electrode material.
Figure 4:
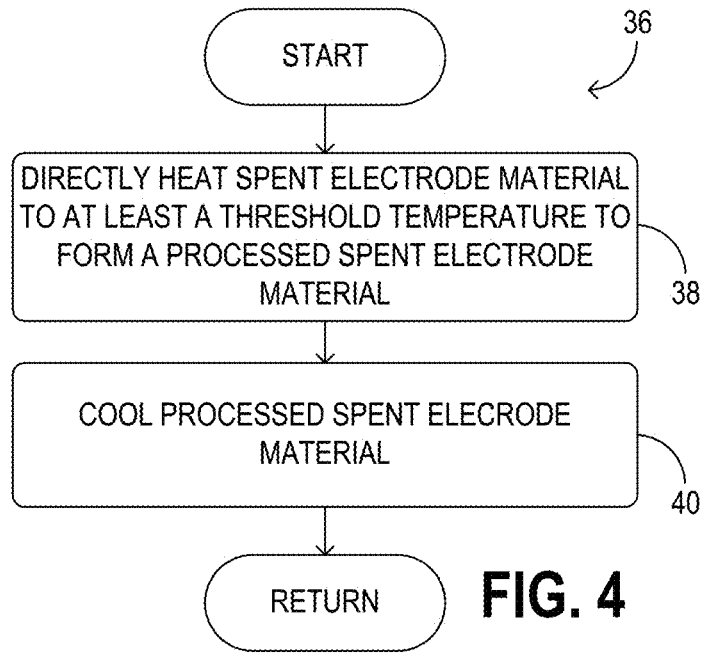
FIG. 4 shows an example embodiment of a method for directly heating a quantity of spent electrode material to promote a change of crystallographic state in the spent electrode material.
Figure 5:
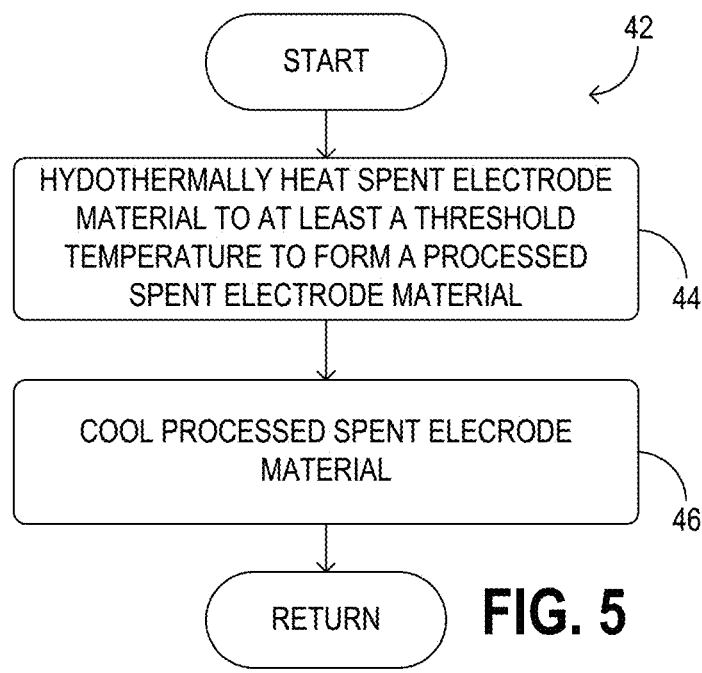
FIG. 5 shows an example embodiment of a method for hydrothermally heating a quantity of spent electrode material to promote a change of crystallographic state in the spent electrode material.
Figure 6:
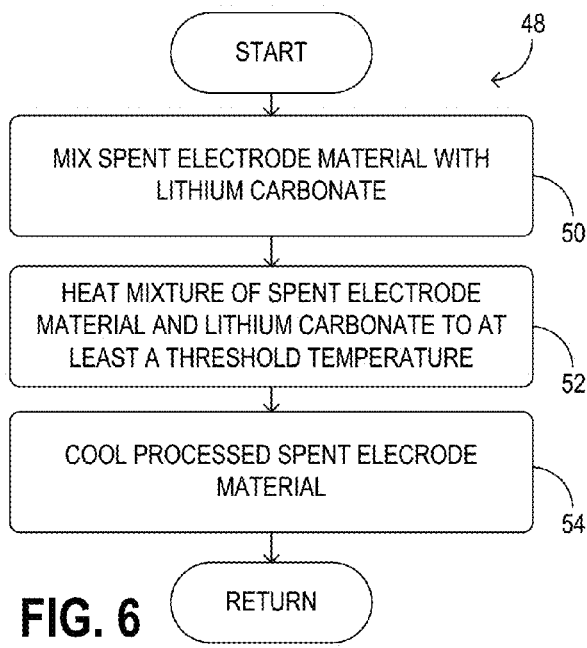
FIG. 6 shows an example embodiment of another method for heating a quantity of spent electrode material to promote a change of crystallographic state and replenish at least some lithium in the spent electrode material.
Figure 7:
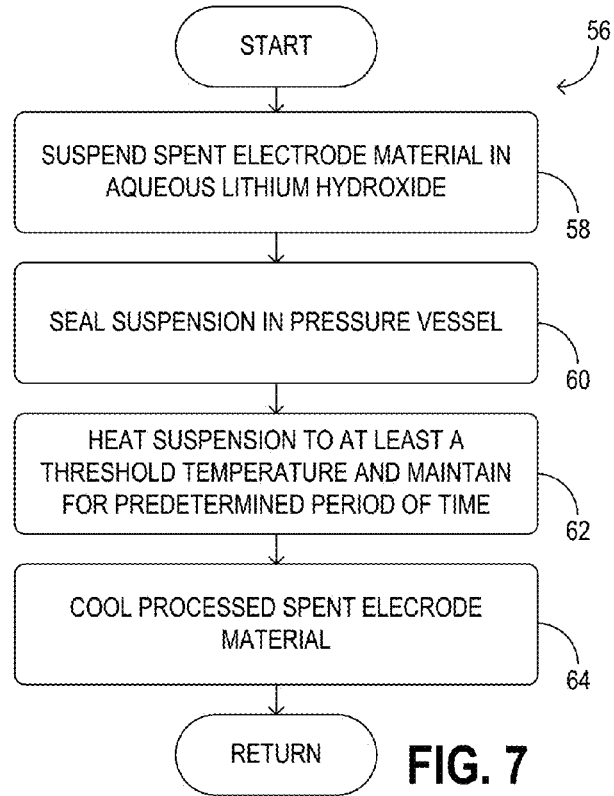
FIG. 7 shows an example embodiment of a method for hydrothermally heating a quantity of spent electrode material to promote a change of crystallographic state and replenish at least some lithium in the spent electrode material.

In some examples, replenishing at least some lithium in the quantity of spent electrode material (an example method of which is shown in FIG. 3) may occur subsequent to promoting a change of crystallographic state in the quantity of spent electrode material (examples methods of which are shown in FIGS. 4 and 5). In other examples, promoting a change of crystallographic state in the quantity of spent electrode material may occur subsequent to replenishing at least some lithium in the quantity of spent electrode material. In yet other examples, replenishing at least some lithium in the quantity of spent electrode material and promoting a change of crystallographic state in the quantity of spent electrode material to yield a reconditioned electrode material may occur during a single heating process (examples of which are shown in FIGS. 6 and 7).

Lithium replenishing may be performed in any suitable manner, including but not limited to solid state synthesis, hydrothermal processing and other wet chemical techniques, etc. For example, FIG. 3 depicts an embodiment of a method for relithiating a spent electrode material that comprises reducing the lithium-deficient electrode material in an environment comprising lithium ions. As used herein, the terms 'reducing,' 'reduction,' etc., will be understood to include any meanings ascribed to them in the field of redox chemistry. As such, they embrace such variants as chemical reduction, electrochemical reduction, and photoelectrochemical reduction. Further, 'reducing . . . in an environment comprising lithium ions' will be understood to include all formal equivalents of the same, such as reacting with a lithium atom donor, i.e., 'lithiating.'

Accordingly, some embodiments comprise allowing the quantity of spent electrode material to react with one or more organolithium compounds, which may include alkyllithium and/or aryllithium compounds. Representative, non-limiting examples include n-butyllithium, sec-butyllithium, methyllithium, lithium napthalide, etc. To facilitate reaction with the quantity of spent electrode material in the suspended state, the organolithium compound may be dissolved in any suitable solvent system, e.g., ethers, hydrocarbons, and mixtures thereof, to which the quantity of spent electrode material is introduced, for example, as a slurry.

FIG. 3 shows an example method 26 for replenishing at least some lithium in a spent electrode material, where the spent electrode material includes at least a portion of material that is lithium deficient. As described above, method 26 may be implemented before, after, or during promotion of a change of crystallographic state in the quantity of spent electrode material. At 28, method 26 includes suspending a lithium deficient electrode material in an ether solvent such as tetrahydrofuran. Vigorous stirring may be used to keep the quantity of spent electrode material in suspension. At 30, method 26 includes sparging the suspension with a stream of dinitrogen to remove dissolved dioxygen and/or carbon dioxide. In another example, the suspension may be stirred vigorously under an atmosphere of dinitrogen.

At 32, method 26 includes adding a solution of 0.25 molar methyllithium dissolved in tetrahydrofuran to the suspension at controlled rate while vigorous stirring is maintained. In one example, the methyllithium solution may be added portionwise. The rate of addition of the methyllithium solution may be responsive to such factors as the initial amount of the lithium deficient electrode material to be reacted, the degree of lithium deficiency of the material, and the temperature of the suspension. For example, a predetermined temperature range for the suspension may be 0-35° C., and the rate of addition of the methyllithium solution may be controlled so that the temperature does not exceed the upper limit of the temperature range. It should be understood that the temperature range given here is merely exemplary, and that other suitable temperature ranges and reaction conditions may be used instead. Further, the methyllithium solution may be added until a predetermined degree of re-lithiation of the lithium deficient electrode material is achieved, e.g., 90% of stoichiometric, 95% of stoichiometric, etc. In one example, the degree of re-lithiation may be determined by withdrawing an aliquot of the suspension from the reaction vessel and assaying the lithium content of the solid in the aliquot. In another example, the degree of re-lithiation may be estimated or inferred based on the concentration of unreacted methyllithium remaining in the suspension sometime after a portion of methyllithium solution is added to the suspension. The concentration of unreacted methyllithium remaining in the suspension may be determined or estimated via any suitable analytical procedure.

At 34, method 26 includes quenching excess methyllithium in the suspension. The excess methyllithium may be quenched by addition of a suitable Lewis acid, e.g., carbon dioxide or an alcohol, to the suspension while vigorous stirring is maintained, or may be quenched in any other suitable manner.

It will be understood that, in other embodiments, lithium replenishing methods may employ other reducing agents besides organolithium compounds. Example reducing agents include, but are not limited to, lithium iodide, lithium dithionite, lithium thiosulfate, and lithium sulfide. In one example, a lithium-deficient $LiFePO_4$-based electrode material may be suspended in a solvent system comprising ethylene carbonate, diethyl carbonate, and/or ethyl methyl carbonate, with lithium iodide added to the suspension. In another example, a lithium-deficient $LiCoO_2$-based electrode material may be suspended in a solvent system comprising alkyllithium, ethylene carbonate, and lithium napthalide, with lithium iodide added to the suspension. In still other examples, a lithium-deficient $Li_2[Mn]_2O_4$-based electrode material or a lithium-deficient $LiNiCoO_2$-based electrode material may be suspended in a solvent system including ethylene carbonate, with lithium iodide added to the suspension. The mixtures may be stirred vigorously for a period of 8-24 hours at ambient temperatures, or heated at reflux, after which treatment the processed electrode material is collected by filtration.

In still other examples, non-lithium based reducing agents such as iron filings, hydrazine or hydrazine-based compounds may be used in conjunction with a non-reducing source of lithium ions, e.g., lithium hydroxide or lithium acetate. Such combinations of reagents may be used to effectively replenish at least some lithium in the lithium deficient electrode material.

Reducing agents such as those described above may be dissolved and/or suspended in various solvent systems, and the lithium deficient electrode material suspended in the resulting mixtures to effect reduction. Thus, to replenish at least some of the lithium in a lithium-deficient electrode material, the material may be suspended in a solution comprising one or more of a lithiating agent, a reducing agent, and lithium ions. Further, suspending the lithium-deficient electrode material in the solution may comprise suspending it in a solution comprising one or more of liquid and supercritical carbon dioxide.

After relithiation, further processing may be performed to promote a desired change of crystallographic state. Turning now to FIG. 4, an example method 36 for directly heating a quantity of spent electrode material to promote a change of crystallographic state in the spent electrode material is shown. At 38, method 36 includes directly heating the quantity of spent electrode material to at least a threshold temperature to form a processed spent electrode material. For example, the quantity of spent electrode material may be heated to a threshold temperature in the range 400-900° C. Heating may be performed in a convection furnace or tube furnace, for example. In some examples, the quantity of spent electrode material may be heated under a reduced dioxygen-content atmosphere or other controlled atmosphere. In other examples, a temperature ramp or other program may be used.

Following the heating step 38, method 36 proceeds to 40. At 40, method 36 includes cooling the processed spent electrode material to thereby recover a reconditioned electrode material. For example, the processed spent electrode material may be cooled to room temperature.

Other methods than direct heating may be used to promote a crystallographic change. FIG. 5 shows an example method 42 for hydrothermally heating a quantity of spent electrode material to promote a change of crystallographic state in the spent electrode material, either before or after lithium replenishment.

At 44, method 42 includes hydrothermally heating the quantity of spent electrode material to at least a threshold temperature to form a processed spent electrode material. Hydrothermally heating a quantity of spent electrode material may include heating the electrode material under any suitable hydrothermal conditions. For example, hydrothermally heating the quantity of spent electrode material may comprise heating the spent electrode material in an aqueous solution containing LiOH at a suitable concentration. Suitable concentrations may include, but are not limited to, concentrations in the range of 2.5-5.2 molar. Likewise, suitable temperatures may include, but are not limited to, temperatures in the range of 90-400° C. Heating may be performed in an enclosed container with pressure in the range 1-300 atmospheres. In some examples, KOH may be added to the aqueous solution to increase alkalinity. In one embodiment, when the quantity of spent electrode material includes $LiCoO_2$, hydrothermally heating the quantity of spent electrode material may comprise heating the spent electrode material in an aqueous solution containing 2.5 M LiOH and lithium carbonate to a threshold temperature in the range 90-150° C. in an enclosed container with pressure of 24 bar for 24 hours. In another embodiment, when the quantity of spent electrode material includes $Li_2[Mn]_2O_4$, hydrothermally heating the quantity of spent electrode material may comprise heating the spent electrode material in an aqueous solution containing 2.5 M LiOH and lithium carbonate to 140° C. in an enclosed container with a pressure of 24 bar for 24 hours. In yet another embodiment, when the quantity of spent electrode material includes $LiNiCoO_2$, hydrothermally heating the quantity of spent electrode material may comprise heating the spent electrode material in an aqueous solution containing 2.5 M LiOH and lithium carbonate to 140° C. in an enclosed container with a pressure of 24 bar for 24 hours. In still another embodiment, when the quantity of spent electrode material includes $LiFePO_4$, hydrothermally heating the quantity of spent electrode material may comprise heating the spent electrode material in an aqueous solution containing $FePO_4$ to 220° C. in an enclosed container with a pressure of 24 bar for 1 hour. In some examples, $FePO_4$ may be included in the aqueous solution during the hydrothermal heating step for any spent electrode material to make a phosphate polymorph for use as battery electrode material. Further, higher pressures during the hydrothermal heating step may reduce processing time, e.g., to one hour. It will be understood that these specific embodiments are presented for the purpose of example, and are not intended to be limiting in any manner.

Following the heating step at 44, method 42 proceeds to 46. At 46, method 42 includes cooling the processed spent electrode material to thereby recover a reconditioned electrode material.

In other embodiments, lithium replenishment and crystallographic state change may occur concurrently. FIG. 6 shows an example method 48 for directly heating a quantity of spent electrode material to promote a change of crystallographic state and replenish at least some lithium in the spent electrode material. Method 48 comprises promoting a solid-state reaction of the lithium-deficient electrode material with a lithium compound intimately present in excess.

In FIG. 6, at 50, method 48 includes intimately mixing the quantity of spent electrode material with lithium carbonate ($Li_2CO_3$). The compounds may be mixed together in any suitable mill, e.g., a ball mill. In other examples, the quantity of spent electrode material may be intimately mixed with LiOH by any suitable method.

At 52, method 48 includes heating the intimate mixture of the quantity of spent electrode material and lithium carbonate. The mixture may be heated in a convection furnace or tube furnace, for example. In some examples, the mixture may be heated under a reduced dioxygen-content atmosphere or other controlled atmosphere. In one example, the intimate mixture may be heated to a sintering temperature of one or more components of the intimate mixture, for example, and held there for a predetermined period of time. Such sintering temperature may be in a range of 400-900° C., for example. In other examples, a temperature ramp or other program may be used to access sintering temperatures. Heating the intimate mixture to a sintering temperature under appropriate conditions may allow lithium from the lithium carbonate to diffuse into the lattice or lattices of the lithium-deficient electrode material, and also may promote a desired change of crystallographic state, thereby forming a reconditioned material suitable for renewed use in energy-storage devices.

The sintering step described above may be used with or without additional lithium in a treatment step to remove volatile and or flammable agents, or crystallize the lattice to improve performance in the manufactured cell. The inventor has demonstrated post-treatment sintering with NCM materials in which the capacity of recycled/rejuvenated NCM increased from 120 to 150 mAh/g with sintering residue from an autoclave hydrothermal reaction as described above. A second example was communicated to achieve 170 mAhg$^{-1}$ for recycled/rejuvenated NMC. Finally, a prototype full cell was made from recycled/rejuvenated NMC. This full cell comprised a pouch cell composed of recycled/rejuvenated NMC against graphite, has 300 mAh capacity, and the specific capacity was estimated to be 155 mAhg$^{-1}$. The demonstration cell was shown to operate a blue light emitting diode lamp that draws 20 mAh$^{-1}$.

In other examples, different lithium compounds may be used in place of or in addition to lithium carbonate, including but not limited to one or more of $Li_2SO_4$, $LiHCO_3$, LiOH, Lit, LiF, LiCl, $LiCH_3COO$, and/or $Li_2O$. In still other examples, the intimate mixture of the lithium-deficient electrode material and the lithium compound may be heated to a temperature greater than or less than the sintering temperature of any of the components of the intimate mixture. For example, the mixture may be heated to a temperature in the range 700-2500° C. for 1 to 10 days. It should be understood that the temperature and reaction-time ranges given here are merely exemplary and may depend on the compound or compounds present in the lithium-deficient electrode material and on the lithium compounds selected. Such reaction conditions may further depend on the degree of lithium loss and a crystallographic state of the spent electrode material.

Following the heating step at 52, method 48 proceeds to 54. At 54, method 48 includes cooling the processed spent electrode material to thereby recover a reconditioned electrode material.

FIG. 7 shows an example embodiment of a method 56 for concurrently relithiating and promoting a crystallographic state change by hydrothermally heating a quantity of spent electrode material a lithium-ion containing solution. In FIG. 7 at 58, method 56 includes suspending the quantity of spent electrode material in an aqueous lithium hydroxide solution. The method advances to 60, where the resulting suspension is sealed in a pressure vessel, and to 62, where the suspension sealed in the pressure vessel is heated under pressure to an appropriate target temperature and maintained at that temperature for a predetermined period of time. Optimal target temperatures and reaction times may vary from batch to batch of the spent electrode material, and may be determined empirically by subjecting the processed material to appropriate analysis. For example, conventional elemental analysis may be used to assay the lithium content, and x-ray powder diffraction may be used to evaluate the crystalline structure of the processed material. These actions may result in the formation of a reconditioned material suitable for renewed use in energy-storage devices. Further, such heating also may promote a crystallographic state change.

As noted above, method 56 may be performed under various suitable conditions depending on the initial state of the quantity of spent electrode material, e.g., its composition, degree of lithium deficiency, crystallographic state, and in some cases (such as metal phosphates) loss of carbon coating, which provides electron conduction to the active material. In one example, a suspension of $LiCoO_2$-based electrode material may be heated to a threshold temperature in the range 90-400° C. in approximately 2.5 to 4 molar lithium hydroxide for a period of 12-48 hours. In other embodiments, other solvents besides water may be used in the suspension, e.g., tetrahydrofuran, acetonitrile, and hexane. When these solvents are present in the suspension, lower reaction temperatures may be used. Following the heating step at 62, method 56 proceeds to 64. At 64, method 56 includes cooling the processed spent electrode material to thereby recover a reconditioned electrode material.

Figure 8:
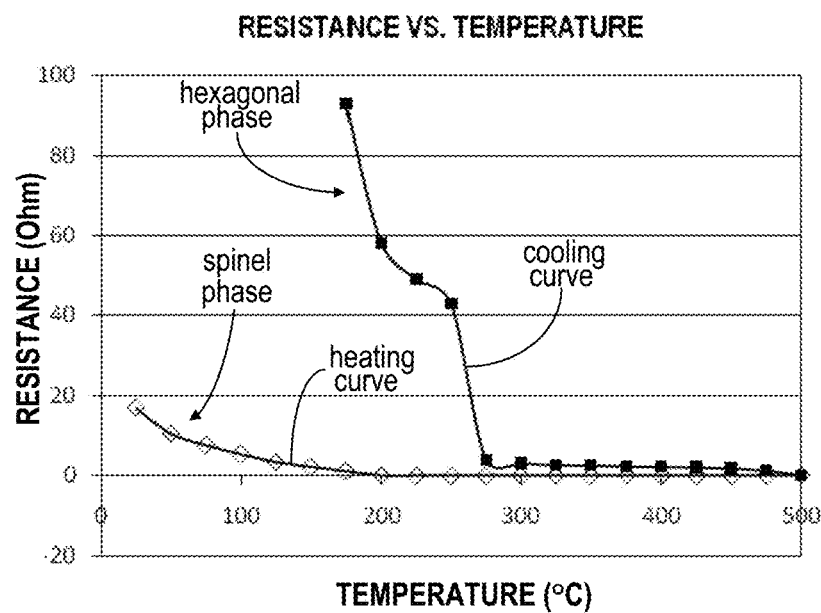
FIG. 8 shows example resistance v. temperature curves for a sample quantity of spent electrode material containing $LiCoO_2$.

FIG. 8 shows example electrical resistance v. temperature curves for a sample quantity of spent electrode material containing $LiCoO_2$. The curve labeled 'heating curve' shows the heating of the sample and the curve labeled 'cooling curve' shows the subsequent cooling of the sample.

In this example, a sample of spinel phase $Li_2[Co_2]O_4$ is heated from approximately room temperature to 500° C. and then cooled. Upon cooling, the resistance of the sample increases substantially as indicated by the cooling curve. The increase in resistance of the sample upon cooling may be indicative of the crystal lattice of the sample transforming from substantially spinel to substantially hexagonal after being heated. The resistance may be increasing because hexagonal $LiCoO_2$ has poor conductivity, while the spinel compound has good conductivity, e.g., electronic resistance of the sample changes from a conductor to an insulator as a result of heating.

Figure 9:
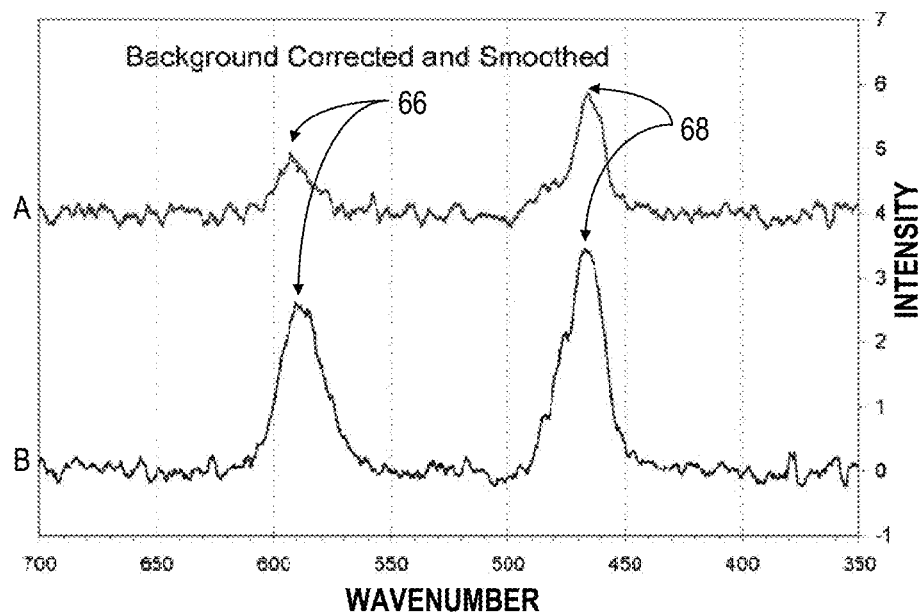
FIG. 9 shows example Raman spectra from a sample of $LiCoO_2$ after hydrothermally heating a quantity of spent electrode material containing the sample of $LiCoO_2$ in a LiOH aqueous solution.

FIG. 9 shows example Raman spectra after hydrothermally heating a sample quantity of spent electrode material containing $LiCoO_2$ in a LiOH aqueous solution at a temperature of 150 degrees Celsius for 48 hours. The Raman spectra shown in FIG. 9 were recorded at room temperature in reflectance mode from powdered $LiCoO_2$ samples with an argon-ion laser using a wavelength of 514.5 nm at 5-10 mW. Before heating, the spent electrode material includes a portion of material in a spinel crystallographic state. In FIG. 9, two different Raman spectra are shown, a first spectra labeled A and second spectra labeled B. Both spectra A and B show characteristic peaks 66 and 68 at wavenumbers 585 and 465, respectively. The peaks 66 and 68 are consistent with the Eg and A1g vibrational scattering modes for hexagonal $LiCoO_2$. Thus, after hydrothermally heating a sample, the portion of material in a spinel crystallographic state converts to a hexagonal crystallographic state as indicated by the Raman spectra in FIG. 9.

The various methods described above may be applied to spent electrode material still present within a lithium or lithium-ion cell. Thus, the approach set forth herein may be applied to various battery-refurbishing, as well as battery-recycling, strategies.

Figure 10:
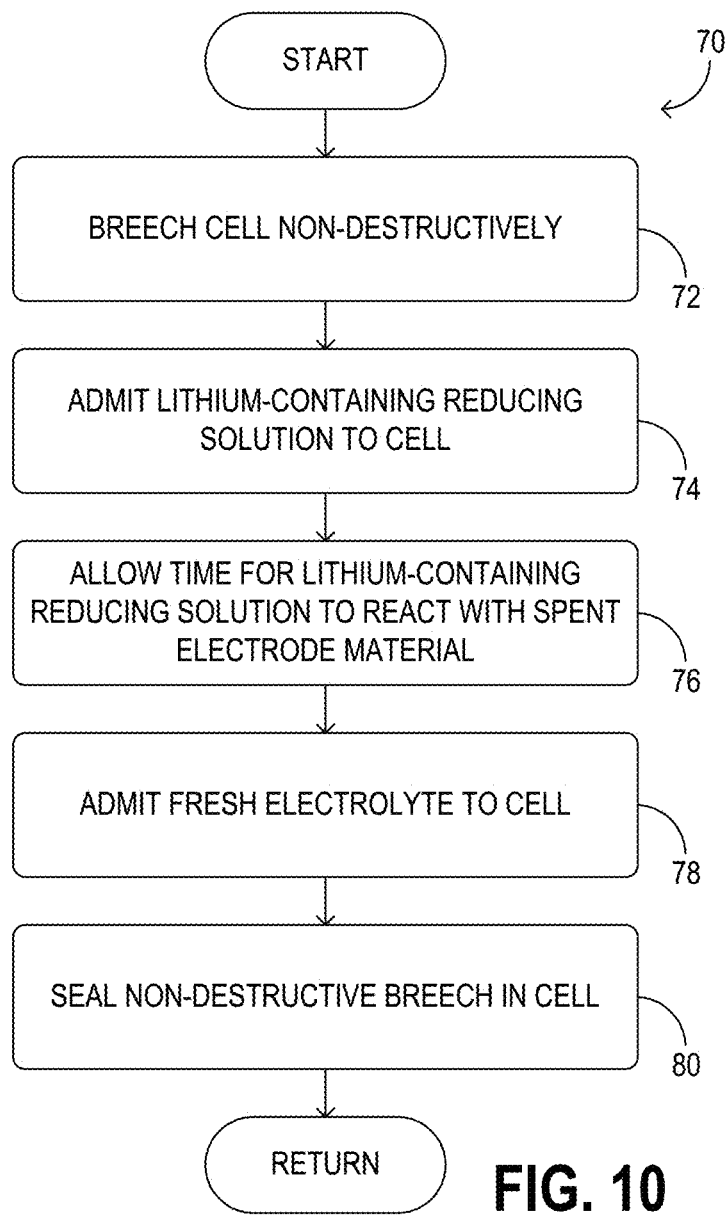
FIG. 10 shows an example embodiment of a method for refurbishing a lithium or lithium-ion cell.

FIG. 10 shows an example lithium or lithium-ion cell refurbishment method 70. In some examples, the method may be enacted in a reduced-dioxygen content atmosphere, as noted above, or in any other suitable manner. The method begins at 72, where an enclosure of the cell is non-destructively breeched. The enclosure may be non-destructively breeched by making a small hole in the enclosure, or, for cells particularly designed for refurbishing, by opening one or more valves disposed between the ambient and the electrolyte of the cell. The method then advances to 74, where a lithium-ion containing, reducing solution is admitted through the breech in the cell. In one example, a solution of lithium iodide in ethylene carbonate, diethyl carbonate, or other suitable solvent may be admitted through the breech in the cell. In another example, a solvent system for the lithium-ion containing, reducing solution may include liquid or supercritical carbon dioxide, which can be further designed to include agents to oxidize lithium from the negative electrode and transport it to and reduce the positive electrode as described above. This type of agent is known as a redox-shuttle, but here applied to a specialized treatment aimed to return a maximum of lithium from the negative electrode to the positive electrode.

The use of a redox shuttle also may be useful for maximizing safety of end-of-life batteries at end-of-life, or after abuse situations that may leave the battery otherwise unable to discharge through a normal external circuit. Such end-of-life batteries may require decommissioning, deactivation, or mitigation of a compromised state in order to improve safety for transportation, disposal, recycling or storage. These shuttles and/or shut-down molecules may be added to the carrier solvent in a concentration <1% up to 25% or more depending on the size and state of the battery under treatment. Typically, 1-5% will effectively and safety oxidize the remaining lithium without producing excess heat. Some non-limiting examples of shuttles include, but are not limited to, iodine, iodide, poly-iodides, sulfides, polysulfides, naphthalene, and carbon dioxide. Further, molecules that react irreversibly may provide efficient results, including but not limited to water, methanol and other alcohols (including but not limited to those with normal, branched, primary, secondary and tertiary structures, and related), related organic acids (such as oxalic formed in-situ or by addition), and esters. Such processes be part of a more extensive battery deactivation process that also may include extraction of the electrolyte using supercritical carbon dioxide or organic solvents such as N-methyl pyrrolidone. For example, in the application of treating lithium-ion batteries, the bulk electrolyte may be removed while maintaining moisture levels below 20 ppm using carbon dioxide compressed into a liquid with a critical point of 31° C. and 71 bar. Carbon dioxide may be removed from the extract mix through depressurization and may be recycled for more extraction while yielding a pure extract. These reversible or irreversible deactivation processes may be performed at a collection and treatment facility prior to actual recycling of the materials, and/or they may also be performed at original collection locations prior to consolidation and shipment for material recycling. Electrolyte extraction may occur as part of these processes.

Continuing in FIG. 10, method 70 then advances to 76, where the cell is allowed time for the lithium-ion containing, reducing solution to react with the lithium-deficient electrode material within the cell. In some examples, the cell may be shaken or rocked to increase the rate of the lithium-replenishing reaction. In these and other examples, the cell may be incubated at greater-than-ambient temperatures to increase the rate of reaction. The method then advances to 78, where fresh electrolyte solution is admitted to the cell through the breech. In some examples, this step of the process may further comprise forcing out some or all of the lithium-ion containing, reducing solution which was admitted to the cell at 74, by utilization of supercritical carbon dioxide, centrifugation, or in any other suitable manner. The method then advances to 80, where the breech in the cell is sealed. Sealing the breech in the cell may comprise closing one or more of the valves referred to above, or, in cells not particularly designed for refurbishing, by applying a sealant or adhesive to the breech.

In other examples, the lithium-deficient electrode material may be reduced electrochemically in a solution comprising lithium ions. This approach may be most easily accomplished using a positive electrode of a spent battery which is separated intact from a breeched cell of the battery. In other examples, however, the lithium-deficient electrode material may be deposited on a tray or grid electrode, in pieces or in a finely divided state, and the tray or grid electrode biased at a reducing potential within an electrochemical cell. Example solutions for the electrochemical reduction include aqueous, one-molar lithium hydroxide, but other lithium-ion containing solutions may be used instead.

In still other examples, the lithium-deficient electrode material may be photolyzed in an environment comprising lithium ions. In one example, the lithium-deficient electrode material may be intimately mixed with lithium iodide and subject to ultraviolet (UV) irradiation. The mixture may be irradiated in the solid state or in a slurry. In one example, the slurry may be flowed through an intense UV irradiance for efficient and consistent irradiation. In another example, an auger may be used to conduct the mixture in solid form through the UV irradiance.

It should be understood that replenishing at least some lithium in a lithium deficient electrode material may correspondingly promote a change of crystallographic state in the electrode material. For example, replenishing lithium in a lithium deficient form of $Li_xCoO_2$ to x=1 may also promote the change of crystallographic state from a spinel to a hexagonal crystallographic structure in $LiCoO_2$. Thus, the various replenishing methods described above may also be applied to effect a change of crystallographic state to yield a reconditioned electrode material.

Returning to FIG. 1, following step 24, method 10 may optionally advance to 82. At 82, method 10 includes processing the reconditioned electrode material. For example, the reconditioned electrode material may be further processed in preparation for re-use in an energy storage device. An example method 84 for processing a reconditioned electrode material is shown in FIG. 11.

Figure 11:
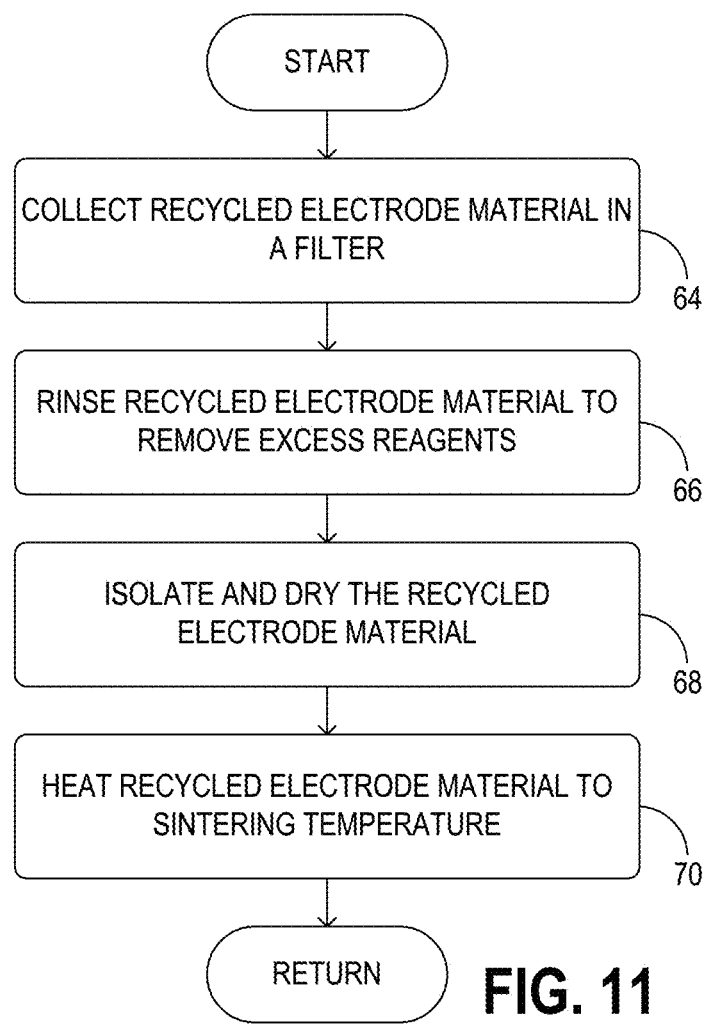
FIG. 11 shows an example embodiment of a method for processing a reconditioned electrode material.

In FIG. 11, at 86, method 84 includes collecting the reconditioned electrode material in a filter. Method 84 then proceeds to step 88. At 88, method 84 includes rinsing the reconditioned electrode material with a solvent to remove one or more excess reagents which may have adhered to the material in the course of one or more replenishing procedures and/or change of crystallographic states. For example, the reconditioned electrode material may be rinsed with liquid carbon dioxide or supercritical carbon dioxide.

At 90, method 84 includes isolating the reconditioned electrode material by filtration. In other examples, centrifugation may be used to isolate the reconditioned electrode material, instead of or in addition to filtration. In these and other examples, the isolation step may further comprise drying the reconditioned electrode material. For example, the reconditioned electrode material may be dried in air, e.g., by drawing air through the filter. In other examples, the reconditioned electrode material may be dried with carbon dioxide. Following isolation of the reconditioned electrode material, method 84 advances to 92. At 92, the isolated reconditioned electrode material is heated to a sintering temperature. Sintering may be done to increase the crystallinity of the reconditioned electrode material, as noted above.

It is further noted that, depending on which of the various contemplated replenishing examples is enacted at 24, sintering at 92 may constitute a first or subsequent sintering process in method 84. Moreover, additional examples contemplated and fully embraced by this disclosure may comprise a sintering process prior to replenishing at 24.

By way of example and with reference to FIGS. 12-18, the methods disclosed herein were used to recondition spent $LiCoO_2$ electrode material from notebook computer battery packs. The notebook computer packs were in an end-of-life state with an average of 116 cycles and greater than 30% capacity fade. The electrode materials were cleanly separated and recovered separately from the packaging materials, electrodes/grids and separators. Screening operations were used to remove separators and grids. The containment cans encasing the electrode materials included iron and were removed magnetically. A hydrothermal process as disclosed above herein was utilized to reinstate the structure and lithium content of the recovered $Li_{(1-x)}CoO_2$ positive electrode material.

Figure 12:
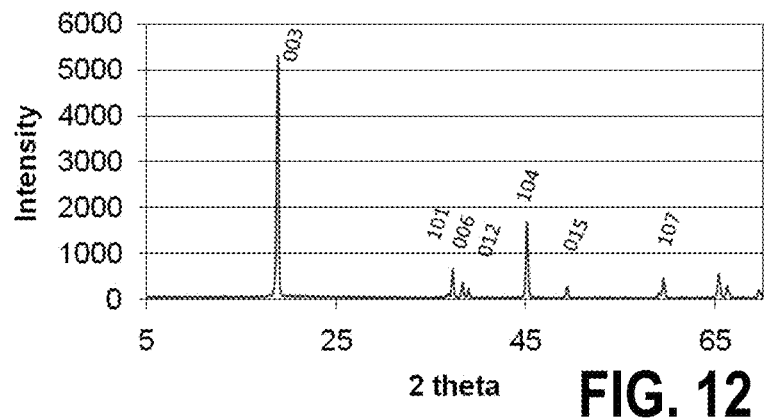
FIG. 12 shows an X-ray diffraction pattern of a sample reconditioned $LiCoO_2$ electrode material.

When reconditioned, the $LiCoO_2$ from these cells showed performance characteristics suitable for use as a battery material. FIG. 12 shows an x-ray diffraction pattern of the reconditioned $LiCoO_2$ electrode material. In FIG. 12, the Miller index for each peak is shown adjacent to the peak. The Miller indices and peak intensities in this example indicate a hexagonal phased material. For example, the high intensity and low breadth of the 003 x-ray diffraction peak is evidence of well-ordered oxide planes in the reconditioned electrode material. Further, the 2-theta position shifted to a higher angle after the electrode material was reconditioned, thus indicating a contraction of the unit cell c-dimension consistent with increasing lithium content.

Figure 13:
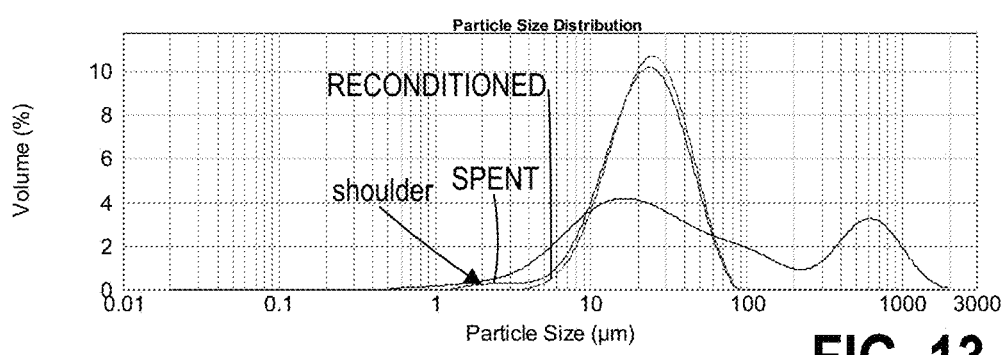
FIG. 13 shows a graph of a particle size distribution of a sample spent $LiCoO_2$ electrode material and a sample reconditioned $LiCoO_2$ electrode material.

FIG. 13 shows the particle size distribution of the spent $LiCoO_2$ material (labeled "spent") and reconditioned $LiCoO_2$ material (labeled "reconditioned"). Spent electrode materials from batteries may undergo structural changes and therefore produce splayed material with a non-uniform particle size. In FIG. 13, the particle size distribution of the spent $LiCoO_2$ material exhibits a left-hand shoulder on the particle size distribution curve, whereas the particle size distribution of the $LiCoO_2$ material reconditioned via the hydrothermal treatment disclosed herein exhibits no shoulder. This may indicate that the material has crystallized into a uniform mode. The curve with the prominent, broad right-hand peak corresponds to graphite in the sample.

Figure 14:
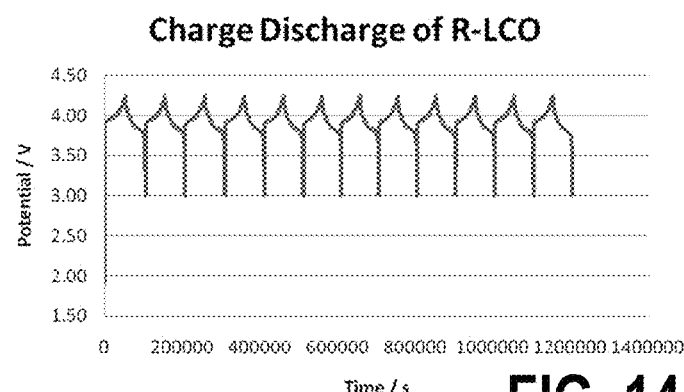
FIGS. 14 and 15 show charge-discharge curves for a sample reconditioned $LiCoO_2$ electrode material.
Figure 15:
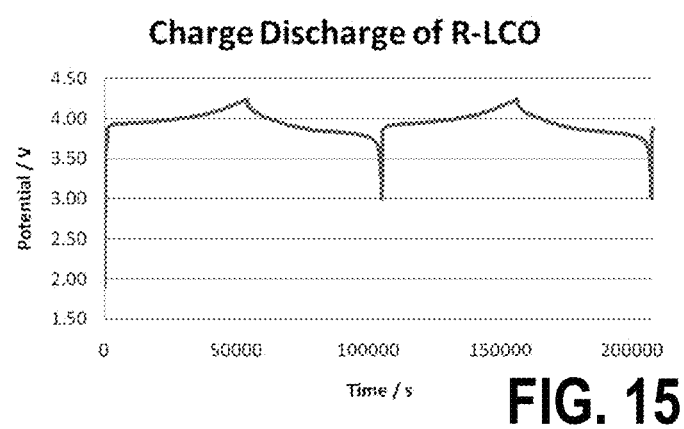
Figure 16:
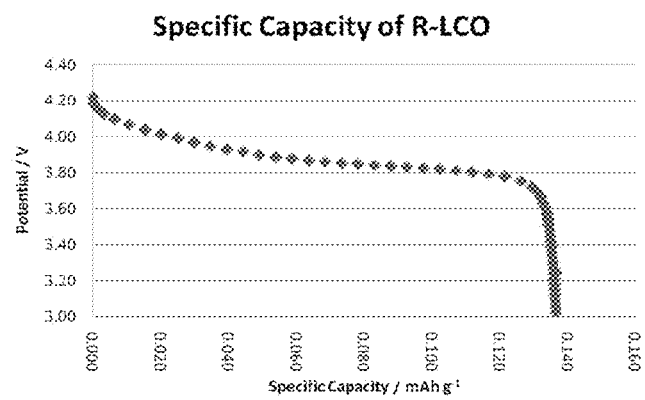
FIG. 16 shows the specific capacity of the first charge-discharge cycle from FIGS. 14 and 15.

To demonstrate the electrochemical activity of the recycled material, button cells were manufactured by placing the positive electrode material against lithium metal. The cells were cycled at the C/20 rate between 3 and 4.25 V. Example charge-discharge curves from such experiments are shown in FIGS. 14 and 15. FIG. 14 shows a charge-discharge curve for $LiCoO_2$ against lithium metal at C/20 while FIG. 15 shows detail of the first two cycles of the charge discharge curve for $LiCoO_2$ against lithium metal at C/20 from FIG. 14. The specific capacity of the first cycle from FIGS. 14 and 15 is shown in FIG. 16. At 4.25 V, the sample is lithium depleted to approximately $Li_{(0.5)}CoO_2$, as the cell discharges, lithium is inserted into the lattice and the equivalent capacity is recorded. The theoretical specific capacity for $LiCoO_2$ is 140 mAh $g^{-1}$. Based upon the fraction of active material in the sample, the recycled compound cycled with very nearly theoretical specific capacity.

Figure 17:
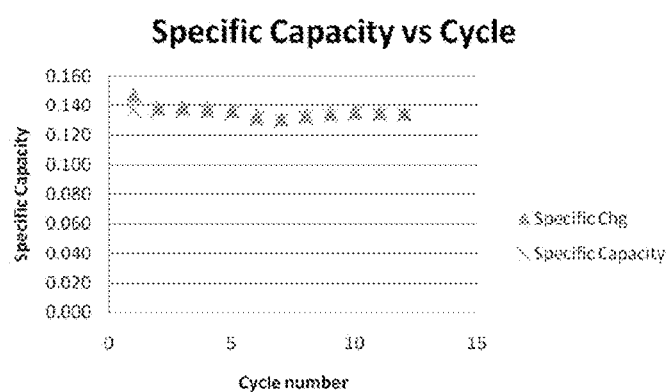
FIG. 17 shows a graph of specific capacity as a function of charge-discharge cycle number for a sample reconditioned $LiCoO_2$ electrode material.
Figure 18:
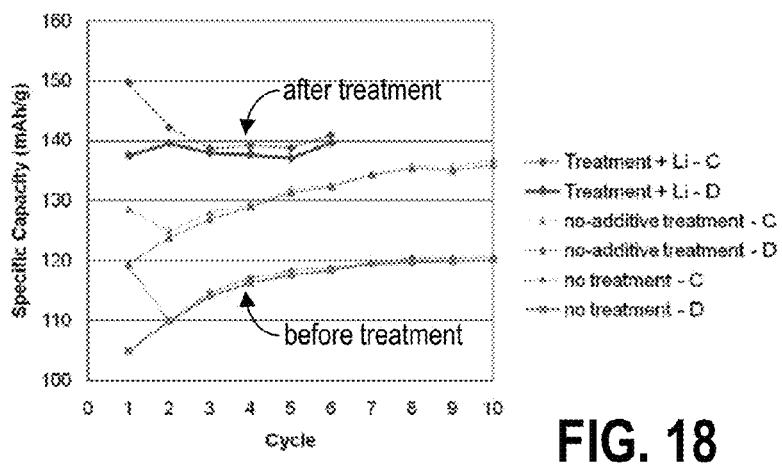
FIG. 18 shows a graph of specific capacity as a function of charge-discharge cycle for a sample $LiCoO_2$ electrode before and after reconditioning.

FIG. 17 shows specific capacity as a function of cycle number for the recovered $LiCoO_2$ material. The specific capacity was estimated from the weight fraction of inactive material, such as carbon black, that is in the sample. Some variation is evident due to temperature changes in the laboratory, but the results show that the recovered material may have the ability to maintain high capacity over time and use. For comparison, FIG. 18 shows specific capacity as a function of charge-discharge cycle number for $LiCoO_2$ before treatment and after treatment. The samples labeled "no treatment" are from unprocessed spent battery materials, the samples labeled "no additive—treatment" are from hydrothermally treated battery materials without LiOH in the hydrothermal vessel, and the samples labeled "Treatment+Li" are from hydrothermally treated battery materials with LiOH in the hydrothermal vessel. The increase in performance over the untreated material may be due to reincorporation of lithium into the positive electrode lattice. FIG. 18 shows the specific capacities of the regenerated material to be nearly the theoretical capacity, 140 mAh $g^{-1}$, while the first discharge cycle for the raw, recovered material is ~105 mAh $g^{-1}$. Treatment time can be increased to produce a higher capacity material, for example, with 160 mAh $g^{-1}$. The difference may be due to a lack of lithium in the lattice of the recovered material. Residual carbon helps to maintain electrical connectivity between cathode particles and the current collector, but does not directly contribute to capacity. When corrected for carbon present in the sample, the specific capacity of the raw, recovered material is ~120 mAh $g^{-1}$. The material lacked lithium in a 1:1 ratio with cobalt, and elemental analysis showed a Li:Co ratio of 0.86:1. Even so, the lithium cobalt oxide lattice was able to regain lithium content and return to theoretical levels utilizing a low temperature treatment as described above. Likewise, depleted NMC's, spinels and mixtures thereof may be treated as described above to reinstate lithium content in the lattice. Depleted NMC from a used cell can be returned to capacity nearly, equal, and above the theoretical original level.

Figure 19:
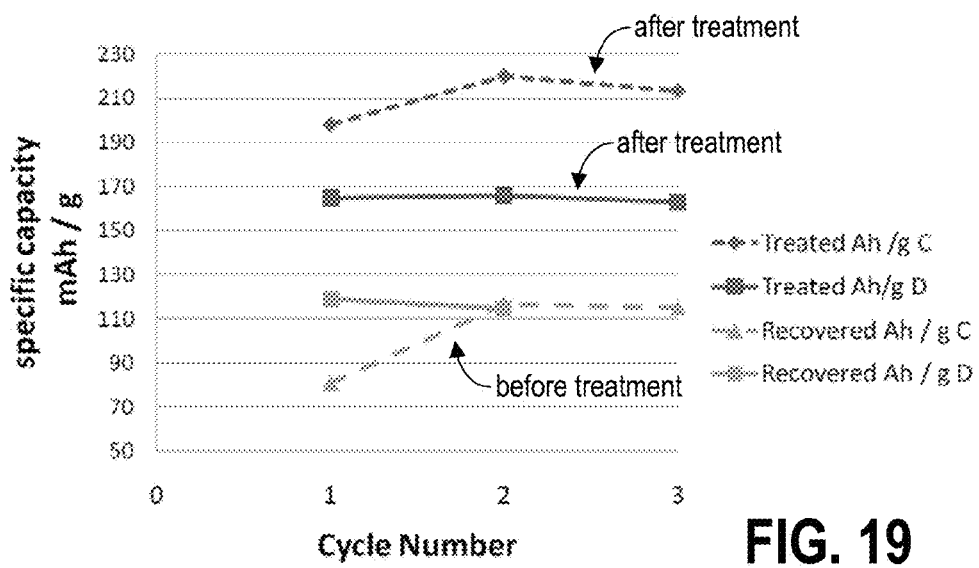
FIG. 19 shows a graph of specific capacity as a function of charge-discharge cycle for a sample LiFePO$_4$ electrode before and after reconditioning.

Likewise, FIG. 19 shows specific capacity as a function of charge-discharge cycle for a sample $LiFePO_4$ electrode material before and after treatment with the methods described above. As shown in FIG. 19, the regenerated $LiFePO_4$ electrode material performs with nearly the theoretical capacity, 170 mAh $g^{-1}$.

Figure 20:
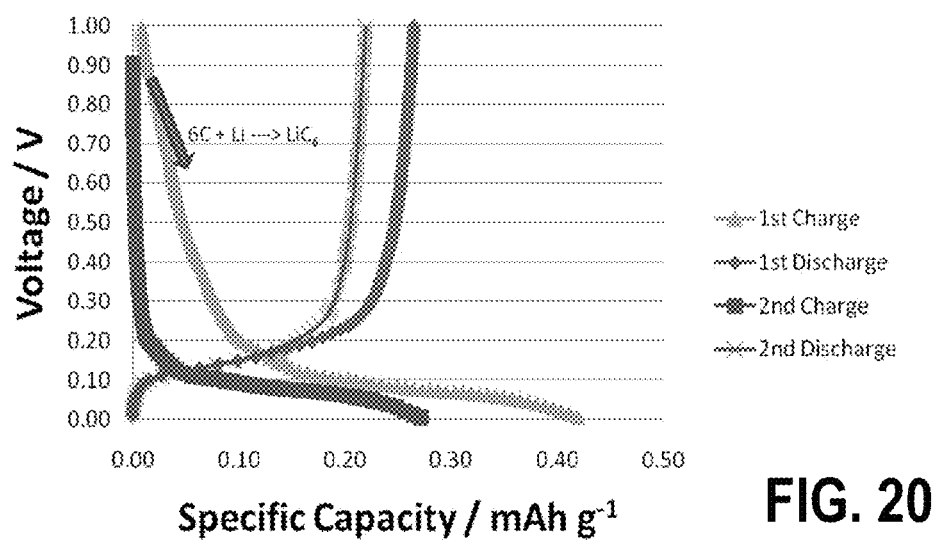
FIG. 20 shows a graph of electrochemical performance of recovered graphitic carbon upon cycling as voltage versus specific capacity plotted for the first and second discharge cycles.

FIG. 20 shows electrochemical performance of a sample of recovered graphitic carbon, C(Li), upon cycling as voltage versus specific capacity plotted for the first and second discharge cycles. The sample of recovered C(Li) was evaluated in a test cell against lithium. The specific capacity was estimated from the weight fraction of inactive material, such as carbon black, that was in the sample. As shown in FIG. 20, the recovered graphitic carbon is able to shuttle lithium-ions successfully.

Figure 21:
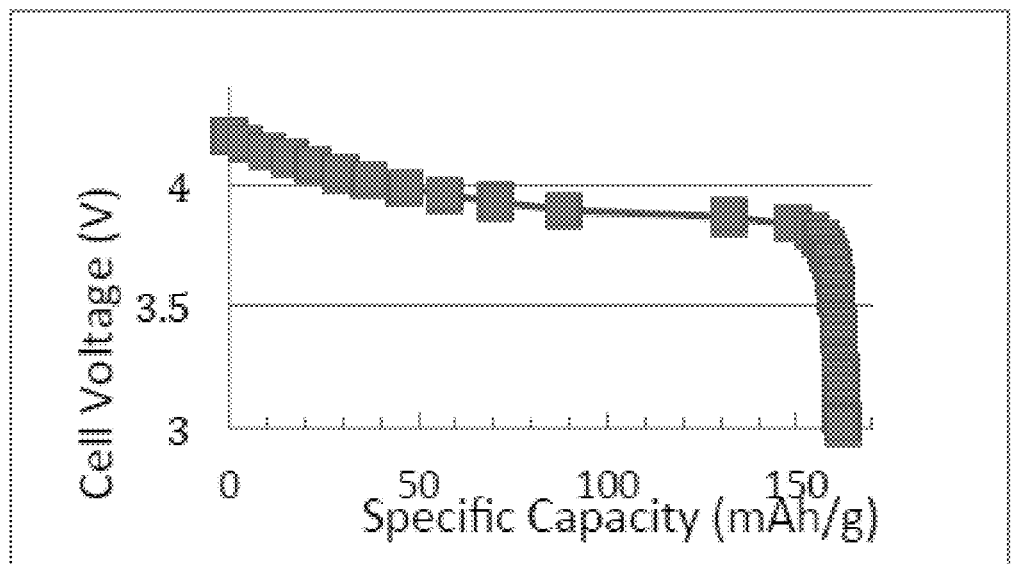
FIG. 21 shows a graph representing a specific capacity of a reconditioned LCO material, and illustrates a specific capacity higher than an originally manufactured material.

FIGS. 21-24 show results of additional experiments in which specific capacities of batteries were determined for materials reconditioned as disclosed herein. First, FIG. 21 shows a graph representing a specific capacity of a reconditioned LCO material, and illustrates a specific capacity higher than an originally manufactured material. More specifically, the original manufactured specific capacity for the LCO material was 140 mAh/g, and the specific capacity of the reconditioned material was 160 mAh/g. Further, it was also determined that the recovered material had a higher purity than the original manufactured material. More specifically, it was found that the original manufactured material had a trace metal content in the ppm (parts per million) level, whereas the reconditioned material had a trace metal content in the ppb (parts per billion) level. The reconditioned material was also able to be successfully coated onto an aluminum current collector. The reconditioned material was prepared by hydrothermally treating the spent material from the used battery at 200 degrees Celsius in 3.5M LiOH for 10 hours, and then sintering at 800 degrees Celsius for 14 hours. A temperature ramp of 2 degrees C. per minute was used for heating and cooling during sintering.

Figure 22:
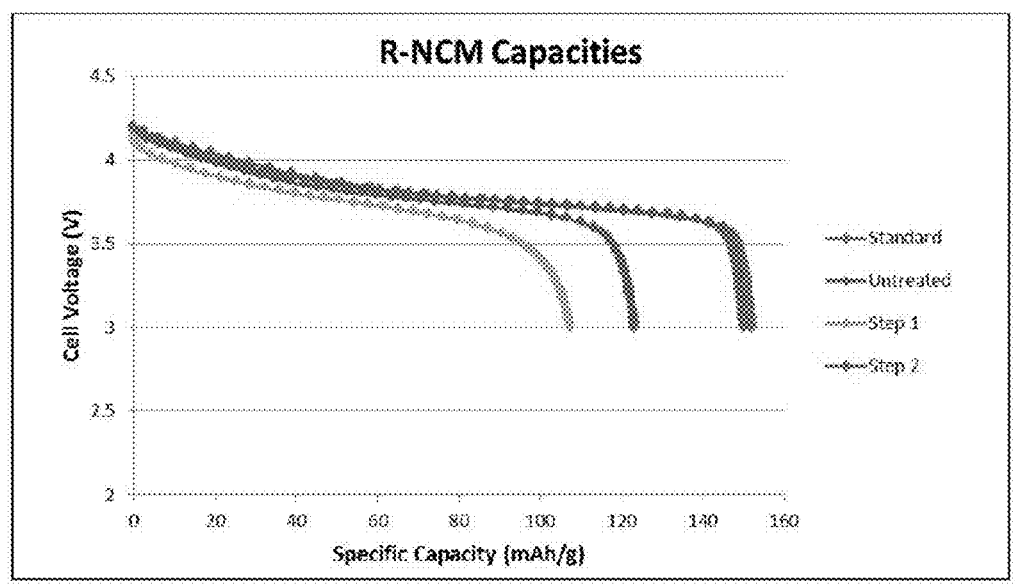
FIG. 22 shows a graph representing a specific capacity of a NMC material in an untreated state, after hydrothermal treatment, and after hydrothermal treatment plus sintering, compared to a standard NMC material.

Next, FIG. 22 shows a graph representing a specific capacity of a NMC material in an untreated state, after hydrothermal treatment, and after hydrothermal treatment plus sintering, compared to a standard NMC material. The same conditions were used to treat the NMC material as described above for LCO with regard to FIG. 21. In FIG. 22, "Step 1" represents the material after hydrothermal treatment, and "Step 2" represents the material after hydrothermal treatment and sintering. As shown, the material recovered essentially its original specific capacity after hydrothermal treatment plus sintering. Further, the reconditioned material had a low trace metal content. The trace metal content of iron in the reconditioned material was determined to be 5.10 ppm, while the standard material was determined to be 75.34 ppm. These amounts were measured using inductively coupled plasma (ICP) methods on identically digested comparative samples.

Figure 23:
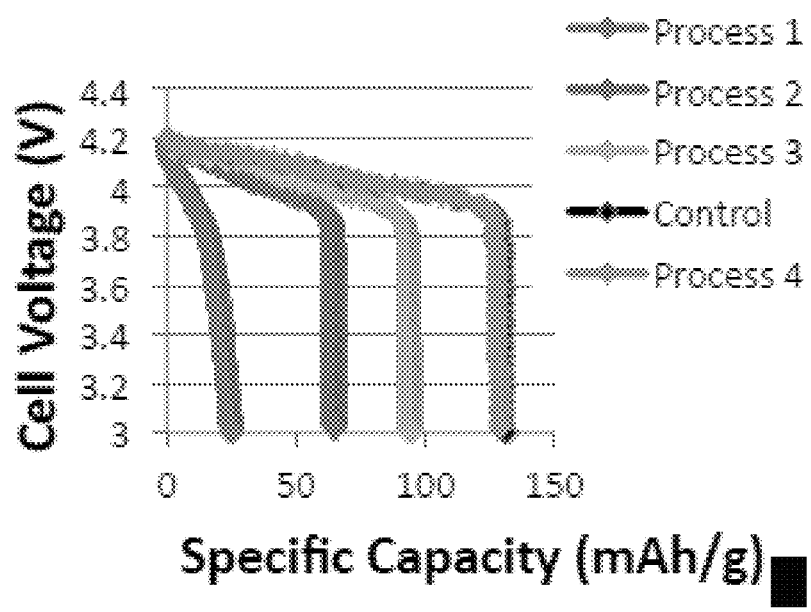
FIG. 23 shows a graph representing specific capacities of a LMO material after four different reconditioning processes as compared to a control sample.

FIG. 23 shows a graph representing specific capacities of a LMO material after four different reconditioning processes as compared to a control sample. In this graph, "process 1" represents removing the spent material from the battery, "process 2" represents hydrothermal treatment using the conditions described above with regard to FIG. 21, "process 3" represents washing the hydrothermal product with water and acetone, and process 4 represents sintering. As shown, process 4 recovered essentially its original specific capacity as compared to the illustrated control sample.

Figure 24:
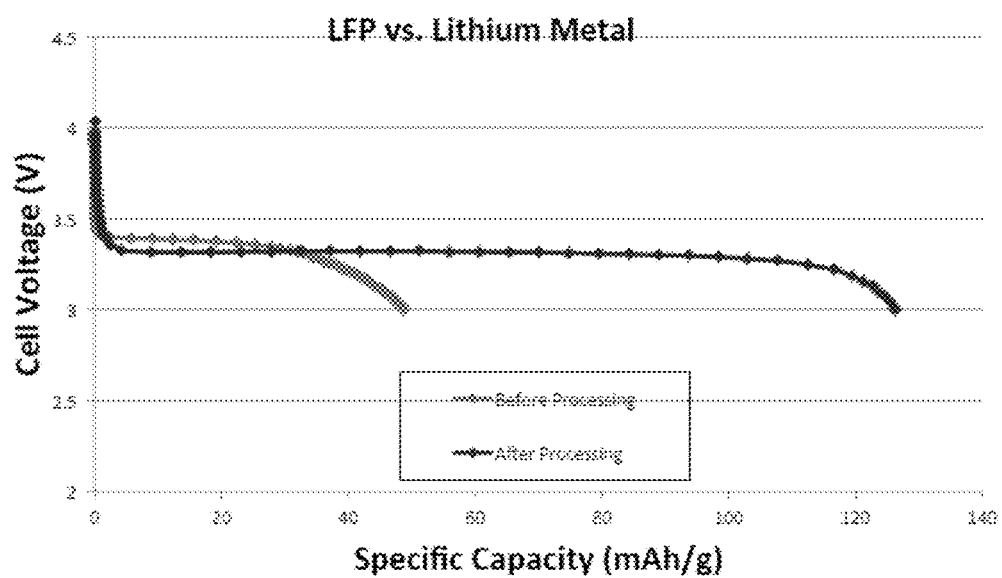
FIG. 24 shows a graph representing a specific capacity of a LFP material before and after reconditioning.

FIG. 24 shows a graph representing a specific capacity of a LFP (lithium iron phosphate) material before and after reconditioning. In this figure, it can be seen that the specific capacity of the material after processing was approximately 130 mAh/g, whereas the specific capacity before processing was less than 60 mAh/g. It will be noted that the LFP materials for FIG. 19 and for FIG. 24 were obtained from different sources and have different specific capacities. The material of FIG. 24 was from an electric vehicle prototype cell and thus configured to have a high rate capability (e.g. capability to provide high current on demand), while FIG. 19 was material harvested from commercial power tool cells and thus configured to have high capacity (e.g. the ability to store a high quantity of charge). As such, the original capacity of the material of FIG. 24 was quoted to be 130 mAh/g, while the cells of FIG. 19 were quoted to be 170 mAh/g.

The soft-chemical processes and methods described above may be flexible to battery chemistry and may be practiced on any suitable formulation, including but not limited to those described above, as well as to materials such as $LiNi_{0.85}Co_{0.1}Al_{0.05}O_2$, known commercially as NCA and may have variability in the atomic ratios of N:C:A:Li, which is a candidate for use in HEV cells, for example. This formulation contains ~1/10 the cobalt per formula unit as does $LiCoO_2$ and therefore has relatively small scrap metal value using modern pyrometallurgical or hydrometallurgical processes. On the other hand, the whole cathode material, when reclaimed with soft-chemical processing such as described above, may maintain significant value. It should be understood that one or more process of the methods described above may be wholly or partly automated, and that the methods may be repeated for any desired number of spent batteries in a waste or recycling stream. Further, it should be understood that the example methods may be part of a more extensive method for recycling batteries and/or processing waste streams that include battery-derived wastes. Further, the example methods may be part of a more extensive method for making a recycled electrode for an energy-storage device or for making an energy storage device. Accordingly, in some examples, one or more actions may be taken prior to the first illustrated steps, and one or more actions may follow the final illustrated steps.

It also will be understood that, in some embodiments, mixed electrode materials may be processed as described above. For example, in some cases a collection of spent electrode materials may comprise a combination of two or more of $LiCoO_2$, $LiTiO2$, $LiFePO_4$, $LiMnO_2$, $LiNi_{0.80}Co_{0.05}Al_{0.15}O_2$, NCAs, NCMs, manganese-spinels, graphite, and/or any other suitable materials. In such a case, similar processing may be performed on the mixed spent electrode materials to form a reconditioned mixed electrode material that may be reused in an energy storage device.

It will be further understood that some of the process steps described and/or illustrated herein may in some examples be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles and methods described herein are exemplary in nature, and that these specific examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for recycling an electrode material for an energy storage device, the method comprising:
   obtaining a quantity of spent lithium nickel manganese cobalt oxide (NMC) electrode material;
   reacting the spent NMC electrode material with an aqueous lithium solution in an autoclave while heating the spent NMC electrode material and the aqueous lithium solution to form a hydrothermally reacted spent NMC electrode material;
   removing the hydrothermally reacted spent NMC electrode material from the aqueous lithium solution; and
   sintering the hydrothermally reacted spent NMC material to form a recycled NMC electrode material having a specific capacity of 120 mAh/g or greater, wherein the recycled NMC electrode material has a greater lithium concentration than the spent NMC electrode material.

2. The method of claim 1, wherein sintering the hydrothermally reacted spent NMC material comprises sintering at a temperature of between 400-900 degrees Celsius.

3. The method of claim 1, wherein reacting the spent NMC electrode material with the aqueous lithium solution in the autoclave while heating comprises reacting the spent NMC electrode material at a temperature of 90-400 degrees Celsius.

4. The method of claim 1, wherein reacting the spent NMC electrode material with the aqueous lithium solution in the autoclave while heating comprises reacting the spent NMC electrode material with an aqueous 2.5-5.2M LiOH solution.

5. The method of claim 1, further comprising utilizing the recycled NMC electrode material in a battery.

6. The method of claim 1, wherein the battery is a pouch battery.

7. The method of claim 1, wherein the recycled NMC material has a specific capacity of 140 mAh/g or greater.

8. The method of claim 1, wherein the quantity of spent NMC electrode material includes an electrode material other than NMC mixed with the spent NMC electrode material.

9. The method of claim 1, wherein the aqueous lithium solution includes complex transition metal ions.

10. The method of claim 1, further comprising washing the hydrothermally reacted spent NMC material with acetone before sintering.

11. The method of claim 10, wherein washing the hydrothermally reacted spent NMC material with acetone comprises washing the hydrothermally reacted spent NMC material with water and acetone.

* * * * *